US012761513B2

(12) United States Patent
Hsu et al.

(10) Patent No.: US 12,761,513 B2
(45) Date of Patent: Oct. 13, 2026

(54) DISPLAY DEVICE

(71) Applicant: AUO Corporation, Hsinchu City (TW)

(72) Inventors: Chia-Chun Hsu, Hsinchu City (TW); Chia-Bin Hsiao, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 19/216,671

(22) Filed: May 22, 2025

(65) Prior Publication Data

US 2026/0161028 A1 Jun. 11, 2026

(30) Foreign Application Priority Data

Dec. 6, 2024 (TW) ................................ 113147498

(51) Int. Cl.
*G02F 1/13357* (2006.01)
*G02F 1/1335* (2006.01)

(52) U.S. Cl.
CPC .. *G02F 1/133606* (2013.01); *G02F 1/133528* (2013.01)

(58) Field of Classification Search
CPC ................ G02B 6/00; G02B 5/18; G02F 1/13
See application file for complete search history.

(56) References Cited

U.S. PATENT DOCUMENTS 10,895,773 B1 1/2021 Zhang
11,972,702 B2 4/2024 Park et al.
2017/0187934 A1* 6/2017 Kwak .................. G06F 1/1686
2019/0278132 A1* 9/2019 Nakamura ........... G02B 5/3025
2019/0384121 A1* 12/2019 Nishiwaki ......... G02F 1/133528
2020/0117034 A1* 4/2020 Yin ....................... G06F 1/1605
2020/0186688 A1* 6/2020 Chen ...................... H04N 23/54
2021/0018793 A1 1/2021 Zhang
2021/0208322 A1* 7/2021 Cammenga ....... G02F 1/133504

FOREIGN PATENT DOCUMENTS

| | | |
|---|---|---|
| CN | 110426878 A | 11/2019 |
| CN | 210155484 | 3/2020 |
| CN | 113421912 | 9/2021 |
| CN | 115151842 | 10/2022 |
| CN | 116381977 A | 7/2023 |
| KR | 20220034947 | 3/2022 |

* cited by examiner

*Primary Examiner* — Leah Macchiarolo
(74) *Attorney, Agent, or Firm* — JCIPRNET

(57) ABSTRACT

A display device includes a display layer, a lower polarizing plate, a film set, a camera module and a backlight module. The lower polarizing plate is located below the display layer. The lower polarizing plate is located between the film layer group and the display layer. The film layer group has a first region and a second region. The camera module is disposed in correspondence with the first region. The film set is located between the backlight module and the lower polarizing plate. The external haze degree in the first region is 0, and the total haze degree in the second region is greater than 0.

18 Claims, 6 Drawing Sheets

DISPLAY DEVICE

CROSS-REFERENCE TO RELATED APPLICATION

This application claims the priority benefit of Taiwan application serial No. 113147498, filed on Dec. 6, 2024. The entirety of the above-mentioned patent application is hereby incorporated by reference herein and made a part of this specification.

BACKGROUND

Technical Field

The disclosure relates to a display device, and particularly relates to a display device including a camera module.

Description of Related Art

In conventional display devices, the polarization and haze settings for the display surface often affect the image quality presented by the display. Therefore, effectively arranging the polarization and haze settings for the display surface may enhance the image quality of the display device. However, the haze device may affect the imaging quality of the under-display camera (UDC), making the polarizing plate a crucial component in display device design.

SUMMARY

The disclosure provides a display device with a favorable imaging quality for its camera module.

A display device according to an embodiment of the disclosure includes a display layer, a lower polarizing plate, a film set, a camera module and a backlight module. The lower polarizing plate is located below the display layer. The lower polarizing plate is located between the film layer group and the display layer. The film layer group has a first region and a second region. The camera module is disposed in correspondence with the first region. The film set is located between the backlight module and the lower polarizing plate. The external haze degree in the first region is 0, and the total haze degree in the second region is greater than 0.

A display device according to an embodiment of the disclosure includes a display layer, a lower polarizing plate, a film set, a camera module and a backlight module. The lower polarizing plate is located below the display layer. The lower polarizing plate is located between the film layer group and the display layer. The film layer group has a first region and a second region. The camera module is disposed in correspondence with the first region. The film set is located between the backlight module and the lower polarizing plate. A side of the first region facing the camera module has a flat outer surface, and the second region includes scattering particles.

According to an embodiment of the disclosure, an internal haze degree of the first region is 0% to 70%.

According to an embodiment of the disclosure, the film set includes a first bonding layer and a protective layer, and the protective layer is located between the first bonding layer and the backlight module.

According to an embodiment of the disclosure, the first bonding layer has scattering particles.

According to an embodiment of the disclosure, a side of the protective layer facing the camera module has a flat outer surface.

According to an embodiment of the disclosure, an internal haze degree of the second region is 5% to 70%, and an external haze degree of the second region is 0% to 70%.

According to an embodiment of the disclosure, a total haze degree of the first region is smaller than the total haze degree of the second region.

According to an embodiment of the disclosure, the film set includes a first bonding layer, a film, and a second bonding layer, the first bonding layer is located between the lower polarizing plate and the film, and the film is located between the first bonding layer and the second bonding layer.

According to an embodiment of the disclosure, the second bonding layer corresponds to the first region, a width of the second bonding layer along a first direction is smaller than a width of the first bonding layer along the first direction, and the first direction is perpendicular to a normal direction of the display layer.

According to an embodiment of the disclosure, the second bonding layer has two sloped sides opposite to each other, and each of the sloped sides is inclined toward a center of the first region and defines an included angle with the film.

According to an embodiment of the disclosure, the included angle is less than 60 degrees.

According to an embodiment of the disclosure, the included angle ranges between 5 degrees and 80 degrees.

According to an embodiment of the disclosure, a side of the second bonding layer facing the camera module has a flat outer surface.

According to an embodiment of the disclosure, the second bonding layer has a thickness in a normal direction of the display layer, and the thickness is less than 20 micrometers.

According to an embodiment of the disclosure, the second bonding layer has a thickness in a normal direction of the display layer, and the thickness ranges between 5 micrometers and 200 micrometers.

According to an embodiment of the disclosure, a width of the camera module along a first direction is smaller than a width of the first region along the first direction, and the first direction is perpendicular to a normal direction of the display layer.

Based on the above, in the display device according to the embodiments of the disclosure, the film set is located between the backlight module and the lower polarizing plate. The side of the first region of the film set facing the camera module has a flat outer surface, the external haze degree of the first region is 0, the second region includes scattering particles, and the total haze degree of the second region is greater than 0. Since the camera module is disposed in correspondence with the set first region, when the camera module is imaging, the image quality may be enhanced. In addition, with the design of the film set, when the display layer of the display device emits light, the display device may exhibit favorable imaging quality. As a result, the display device may be moiré-free for as an LCD while achieving accuracy in UDC image recognition.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figures 1A, 1B:
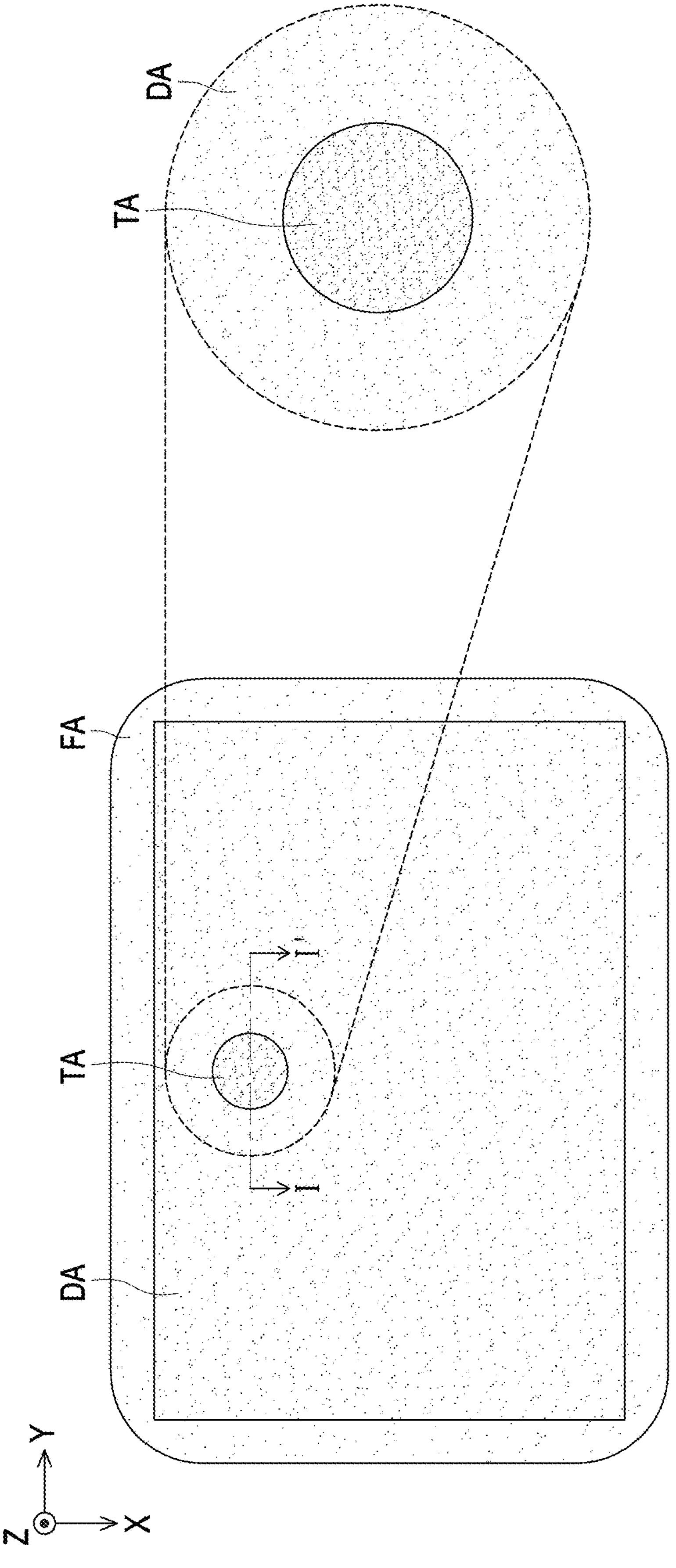
FIG. 1A is a schematic top view illustrating a display device according to an embodiment of the disclosure.
FIG. 1B is a partially enlarged schematic view illustrating the display device according to FIG. 1A.

In the following, the disclosure will be described more comprehensively with reference to the accompanying drawings, in which exemplary embodiments of the disclosure are shown. As those skilled in the art will recognize, the described embodiments may be modified in various different ways without departing from the spirit or scope of the disclosure.

In the drawings, the thickness of layers, films, panels, regions, etc., is enlarged for clarity. Throughout the specification, the same reference numerals denote the same components. It should be understood that when an element such as a layer, a film, a region, or a substrate is indicated to be "on" another element or "connected to" another element, it may be directly on another element or connected to another element, or an element in the middle may exist. Comparatively, when an element is indicated to be "directly on another element" or "directly connected to" another element, an element in the middle does not exist. As used herein, "to connect" may indicate to physically and/or electrically connect. Furthermore, "to electrically connect" or "to couple" may also be used when other elements exist between two elements.

In addition, relative terms such as "below" or "bottom" and "above" or "top" may be used herein to describe a relationship of one element to another element as shown in the figures. It should be understood that the relative terms are intended to encompass different orientations of the device in addition to the orientation depicted in the figures. For example, if the device in a figure is turned over, elements described as being on the "below" side of other elements would be oriented on the "above" side of the other elements. Thus, the exemplary term "below" may encompass both "below" and "above" orientations, depending on the particular orientation of the figure. Similarly, if the device in a figure is turned over, elements described as "beneath" or "below" other elements would be oriented "above" the other elements. Thus, the exemplary terms "above" or "below" may encompass both above and below orientations.

The usages of "approximately", "similar to", or "substantially" indicated throughout the specification include the indicated value and an average value having an acceptable deviation range, which is a certain value confirmed by people skilled in the art, and is a certain amount considered the discussed measurement and measurement-related deviation (that is, the limitation of measurement system). For example, "approximately" may indicate to be within one or more standard deviations of the indicated value, or being within ±30%, ±20%, ±10%, ±5%. Furthermore, the usages of "approximately", "similar to", or "substantially" indicated throughout the specification may refer to a more acceptable deviation range or standard deviation depending on optical properties, etching properties, or other properties, and all properties may not be applied with one standard deviation.

Reference is made herein to cross-sectional views as schematic illustrations of idealized embodiments to describe exemplary embodiments. Therefore, variations from the shapes of the illustrations may be expected as a result of, for example, manufacturing techniques and/or tolerances. Thus, embodiments described herein should not be construed as limited to the particular shapes of regions as illustrated herein but include, for example, shape deviations resulting from manufacturing. For example, a region shown or described as flat may typically have rough and/or nonlinear features. Moreover, sharp angles that are illustrated may be rounded. Thus, the regions illustrated in the figures are schematic in nature, and shapes thereof are not intended to illustrate the precise shape of a region and are not intended to limit the scope of the claims.

Unless otherwise defined, all terminologies (including technical and scientific terminologies) used herein have the same meaning as commonly understood by people having ordinary skill in the art to which the disclosure belongs. It is understood that these terminologies, such as those defined in commonly used dictionaries, should be interpreted as having meanings consistent with the relevant art and the background or context of the disclosure, and should not be interpreted in an idealized or overly formal way, unless otherwise defined in the embodiments of the disclosure.

Figure 2:
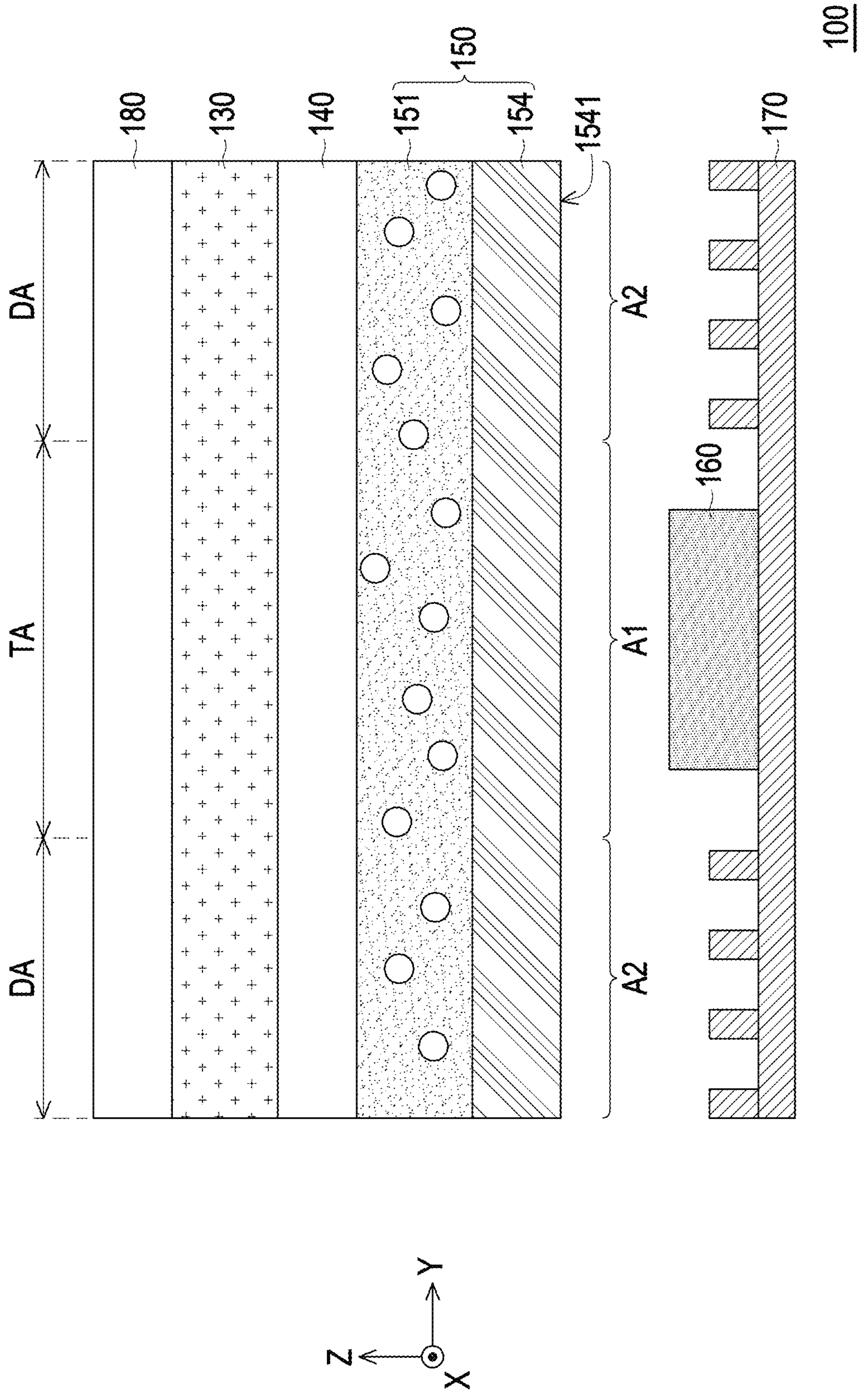
FIG. 2 is a cross-sectional view taken along a cross-sectional line I-I' in FIG. 1A.

FIG. 1A is a schematic top view illustrating a display device according to an embodiment of the disclosure. FIG. 1B is a partially enlarged schematic view illustrating the display device according to FIG. 1A. FIG. 2 is a cross-sectional view taken along a line I-I' in FIG. 1A. It should be noted that X-direction, Y-direction, and Z-direction are marked in the figures to present the configuration relationship among respective elements in the figure, where X-direction, Y-direction, and Z-direction intersect with each other. However, the disclosure is not limited thereto.

Referring to FIG. 1A and FIG. 1B a display device 100 of the embodiment has an outer frame FA around the display device 100. The outer frame FA of the display device 100 includes a display region DA and a light-transmitting region TA. In the embodiment, the light-transmitting region TA is located within the display region DA, with the display region DA surrounding the light-transmitting region TA. However, the disclosure is not limited thereto.

Referring to FIG. 2, in the embodiment, the display device 100 includes an upper polarizing plate 180, a display layer 130, a lower polarizing plate 140, a film set 150, a camera module 160, and a backlight module (backlight unit) 170. It should be noted that some irrelevant structures in FIG. 2 may be omitted to more clearly show and identify the required components.

In the embodiment, the display layer 130 includes a substrate and multiple pixels. An active device array layer and a liquid crystal layer structure may be optionally provided on the substrate, but the disclosure is not limited thereto. The substrate may be, for example, a glass substrate, a plastic substrate, etc., or other plate-shaped components that provide a supportive force. The pixels are arranged into an array on the substrate, for example, along X-direction and Y-direction. However, the disclosure is not limited thereto. In some embodiments, each pixel may include a light-emitting element, such as a light-emitting diode. The diode may include, for example, an organic light-emitting diode (OLED), a mini LED, a micro LED, or a quantum dot (QD) light-emitting diode (e.g., QLED, QDLED), fluorescence, phosphor, or other suitable materials, and the materials may be arbitrarily arranged and combined as appropriate. The disclosure is not limited to the above. In some embodiments, the light-emitting element may be a light-emitting chip, and each pixel may be coupled to the substrate by performing a chip-on-board (COB) process. In other words, the light-emitting chip serving as a pixel may be electrically connected to the substrate.

In the embodiment, the upper polarizing plate 180 is located above the display layer 130, the lower polarizing plate 140 is located below the display layer 130, and the display layer 130 is located between the upper polarizing plate 180 and the lower polarizing plate 140. Specifically, the upper polarizing plate 180 and the lower polarizing plate 140 may each include a multi-layer film structure. The multi-layer film structure may be, for example, a pressure sensitive adhesive (PSA), a triacetate cellulose (TAC) film, or a polyvinyl alcohol (PVA) film. However, the disclosure is not limited thereto.

In the embodiment, the lower polarizing plate 140 is located between the film set 150 and the display layer 130, and the film set 150 has a first region A1 and a second region A2. The second region A2 surrounds the first region A1. The camera module 160 is disposed in correspondence with the first region A1. Specifically, in Z-direction, the light-transmitting region TA, the first region A1, and the camera module 160 are aligned sequentially. Here, the display device 100 is a type of under-display camera (UDC) liquid crystal display (LCD), in which a lens is hidden below the display panel. However, the disclosure is not limited thereto.

In the embodiment, the film set 150 is located between the backlight module 170 and the lower polarizing plate 140. The first region A1 has a flat outer surface on the side facing the camera module 160, and the external haze degree of the first region A1 is 0. The second region A2 includes scattering particles that may scatter ambient light, and the total haze degree of the second region A2 is greater than 0 and not equal to 0. It should be noted that the scattering particles in the figure are simply illustrated schematically as circles. However, the form of the scattering particles is not limited thereto. In an embodiment, the particle sizes of the scattering particles are approximately 1 micron to 5 microns. However, the disclosure is not limited thereto.

With such configuration, the camera module 160 is disposed in correspondence with the first region A1. When the camera module 160 is imaging, the image quality may be enhanced. In addition, with the design of the film set 150, when the display layer 130 emits light, the display device 100 may exhibit favorable image quality. As a result, the display device 100 may be moiré-free for an LCD while achieving accuracy in UDC image recognition. In some embodiments, the value of the UDC image modulation transfer function (MTF) may be improved to 50 or higher, and the image detection quality of the driver monitoring system (DMS) may be effectively enhanced.

In the embodiment, the width of the camera module 160 along the first direction (for example, Y-direction) is smaller than the width of the first region A1 along the first direction, where the first direction is perpendicular to the normal direction (e.g., Z-direction) of the display layer 130. Therefore the camera may be disposed to fully correspond to the light-transmitting region TA. In the embodiment, the camera module 160 is disposed between the backlight module 170 and the film set 150. However, in other embodiments, the camera module 160 may also be disposed below the backlight module 170. The disclosure does not intend to impose a limitation on this regard.

Specifically, in the embodiment, the film set 150 includes a first bonding layer 151 and a protective layer 154. The protective layer 154 is located between the first bonding layer 151 and the backlight module 170. The protective layer 154 has a flat outer surface 1541 on the side facing the camera module 160. Here, the first bonding layer 151 is, for example, a pressure sensitive adhesive (PSA). However, the disclosure is not limited thereto. Here, the protective layer 154 is, for example, a hard coating (HC). However, the disclosure is not limited thereto.

In the embodiment, the second region A2 includes scattering particles. Specifically, the first bonding layer 151 has scattering particles, and the total haze degree of the film set 150 is greater than 0.

In the following, other embodiments will be described for further description. It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 3:
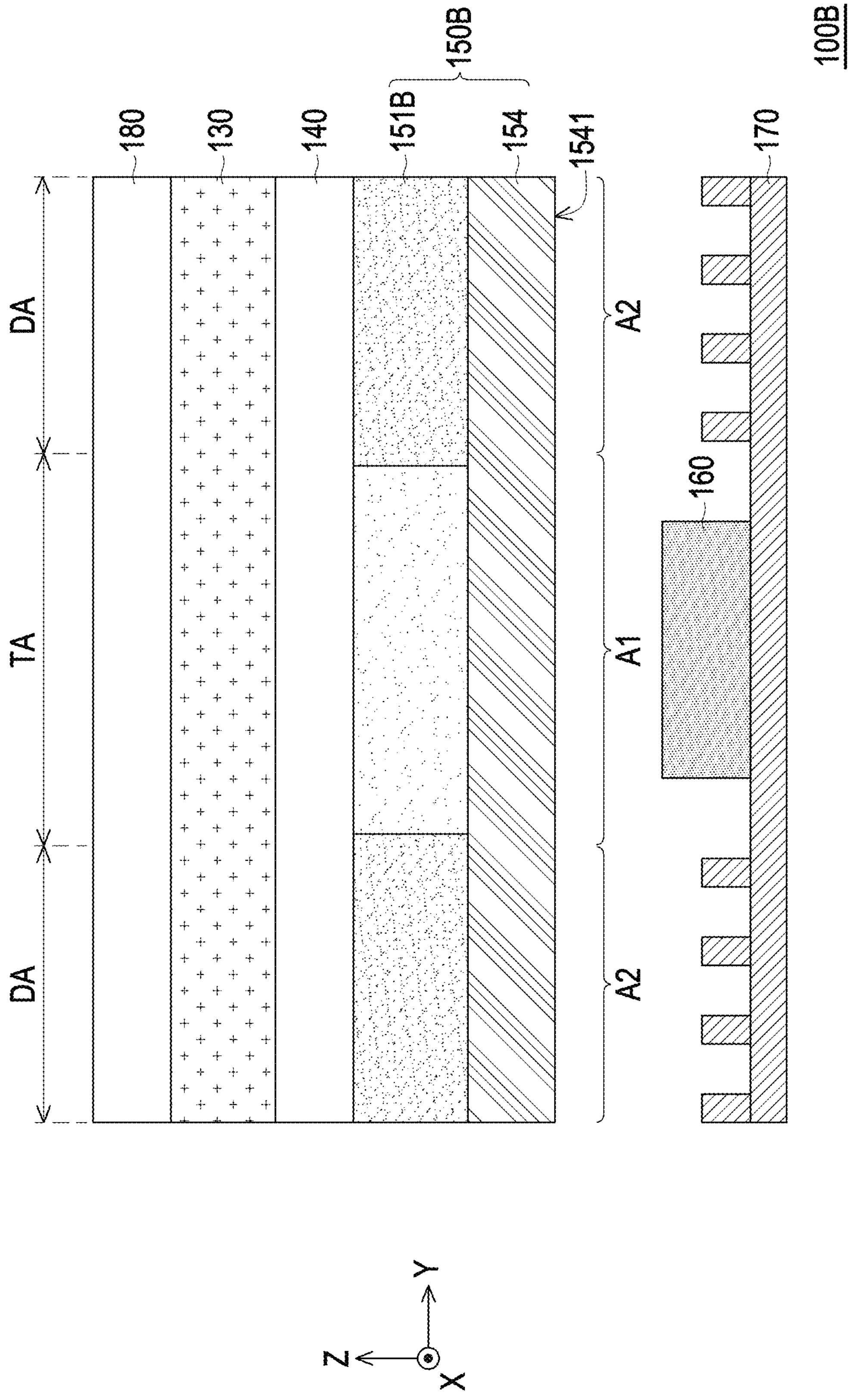
FIGS. 3 to 6 are cross-sectional views illustrating display devices according to multiple embodiments of the disclosure.

FIGS. 3 to 6 are cross-sectional views illustrating display devices according to multiple embodiments of the disclosure. Referring to FIG. 3, in the embodiment, a display device 100B includes a film set 150B. A first bonding layer 151B of the film set 150B has different haze degrees. The first bonding layer 151B is, for example, a PSA in which scattering particles are added, and different haze degrees may be exhibited depending on different addition amounts. However, the disclosure is not limited thereto. Specifically, the haze degree of the first bonding layer 151B corresponding to the first region A1 is smaller than the haze degree of the first bonding layer 151B corresponding to the second region A2. Accordingly, the total haze degree of the first region A1 is smaller than the total haze degree of the second region A2. The internal haze degree of the first region A1 may be designed to be 0% to 70% and the external haze degree of the first region A1 is 0. When the camera module 160 is imaging, the image quality may be enhanced. In addition, with the design of the film set 150B, when the display layer 130 emits light, the display device 100B may exhibit favorable image quality. In the embodiment, the internal haze degree of the second region A2 is 5% to 70%, and the external haze degree of the second region A2 is 0% to 70%. However, the disclosure is not limited thereto.

Figure 4:
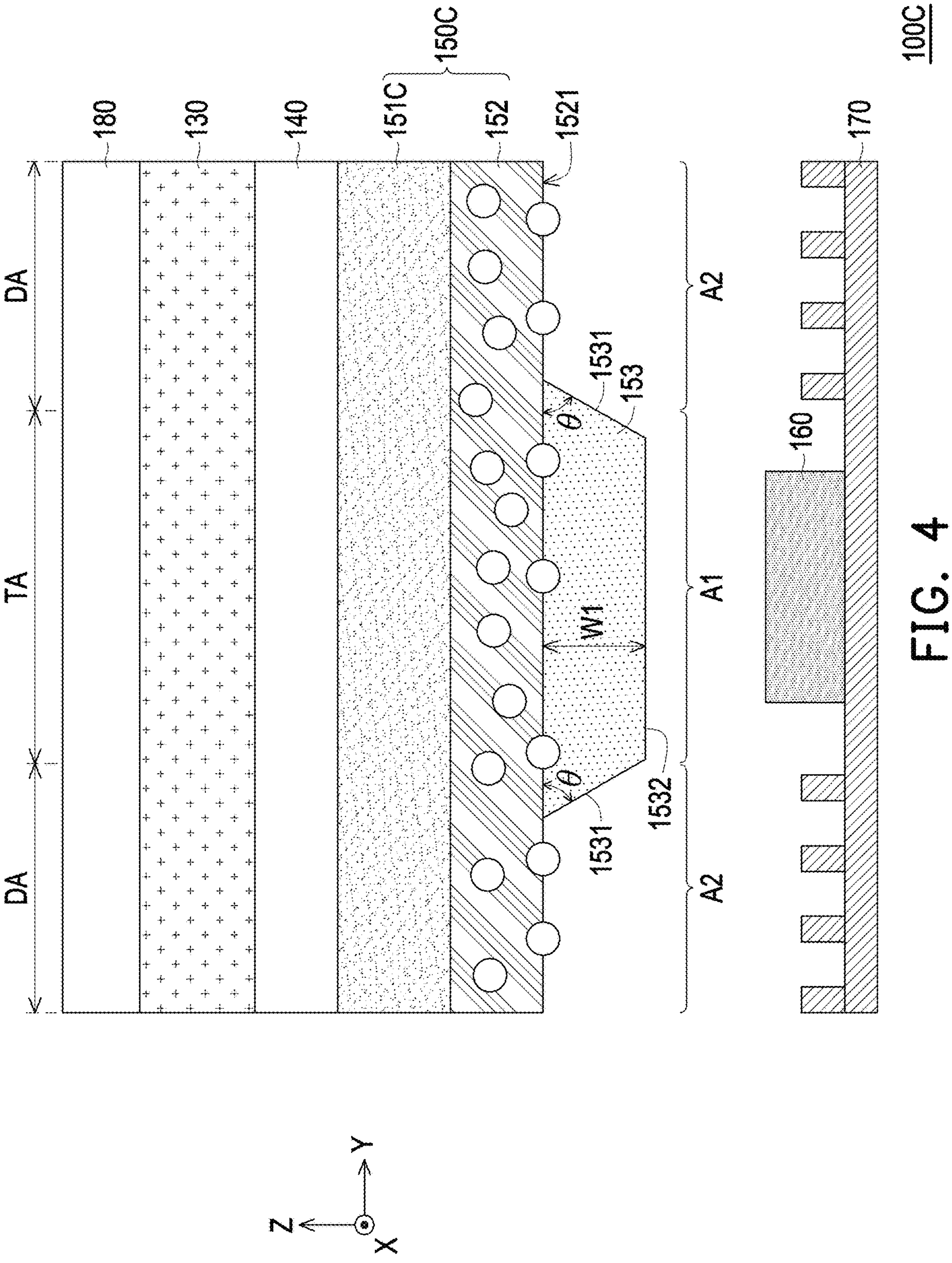

Referring to FIG. 4, in the embodiment, a display device 100C includes a film set 150C. The film set 150C includes a first bonding layer 151C, a film 152, and a second bonding layer 153. The first bonding layer 151C is located between the lower polarizing plate 140 and the film 152, and the film 152 is located between the first bonding layer 151C and the second bonding layer 153. The film 152 is, for example, a haze film. However, the disclosure is not limited thereto.

In the embodiment, the second bonding layer 153 corresponds to the first region A1, and the width of the second bonding layer 153 along the first direction (e.g., Y-direction) is smaller than the width of the first bonding layer 151C along the first direction. The first direction is perpendicular to the normal direction (e.g., Z-direction) of the display layer 130. Specifically, the second bonding layer 153 is dispensed and coated on the film 152, and is aligned with the camera module 160. Here, the second bonding layer 153 is a pressure sensitive adhesive (PSA) without scattering particles. However, the disclosure is not limited thereto.

In the embodiment, the first bonding layer 151C does not have scattering particles, while the film 152 has scattering particles. Accordingly, the internal haze degree of the first region A1 may be designed as greater than 0% and less than or equal to 70%. Nevertheless, the disclosure is not limited thereto. Specifically, a surface 1521 of the film 152 facing the camera module 160 has protruding scattering particles. The portion of the film 152 not covered by the second bonding layer 153 corresponds to the second region A2. Accordingly, the external haze degree of the second region A2 is greater than 0. The portion of the film 152 covered by the second bonding layer 153 corresponds to the first region A1, and the side of the second bonding layer 153 facing the camera module 160 has a flat outer surface 1532. Accordingly, the external haze degree of the first region A1 is equal to 0.

Furthermore, in the embodiment, the second bonding layer 153 has two opposite sloped sides 1531, each sloped side 1531 being inclined toward the center of the first region A1 and defining an included angle θ with the film 152. In an embodiment, the included angle θ ranges between 5 degrees and 80 degrees. However, the disclosure is not limited thereto. In an embodiment, the included angle θ is less than 60 degrees. However, the disclosure is not limited thereto. Additionally, in the embodiment, in the normal direction (e.g., Z-direction) of the display layer 130, the second bonding layer 153 has a thickness W1. In an embodiment, the thickness W1 is less than 20 micrometers. However, the disclosure is not limited thereto. In an embodiment, the thickness is between 5 micrometers and 200 micrometers. With such design, a favorable visual effect from a side perspective is achieved.

Figure 5:
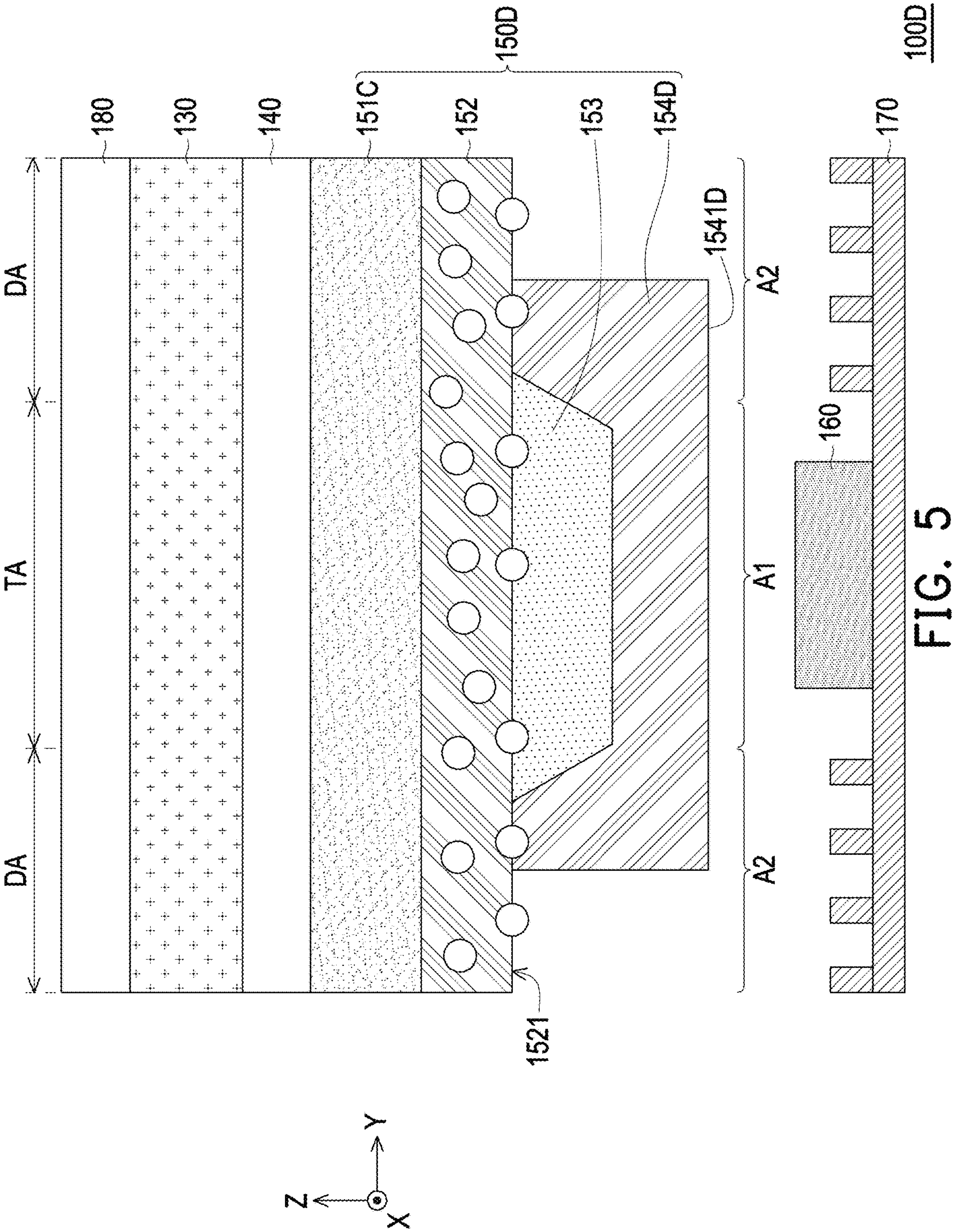

Referring to FIG. 5, in the embodiment, a display device 100D is slightly different from the display device 100C in FIG. 4. The main difference is that: a film set 150D further includes a protective layer 154D, the second bonding layer 153 is encapsulated by the protective layer 154D and located between the protective layer 154D and the film 152. The side of the protective layer 154D facing the camera module 160 has a flat outer surface 1541D. Here, the protective layer 154D is, for example, a hard coating (HC). However, the disclosure is not limited thereto.

In the embodiment, the film 152 has scattering particles. Accordingly, the internal haze degree of the first region A1 of the film set 150D is greater than 0% and less than or equal to 70%. When the camera module 160 is imaging, the image quality may be enhanced. In addition, with the design of the film set 150D, when the display layer 130 emits light, the display device 100D may exhibit favorable imaging quality.

Figure 6:
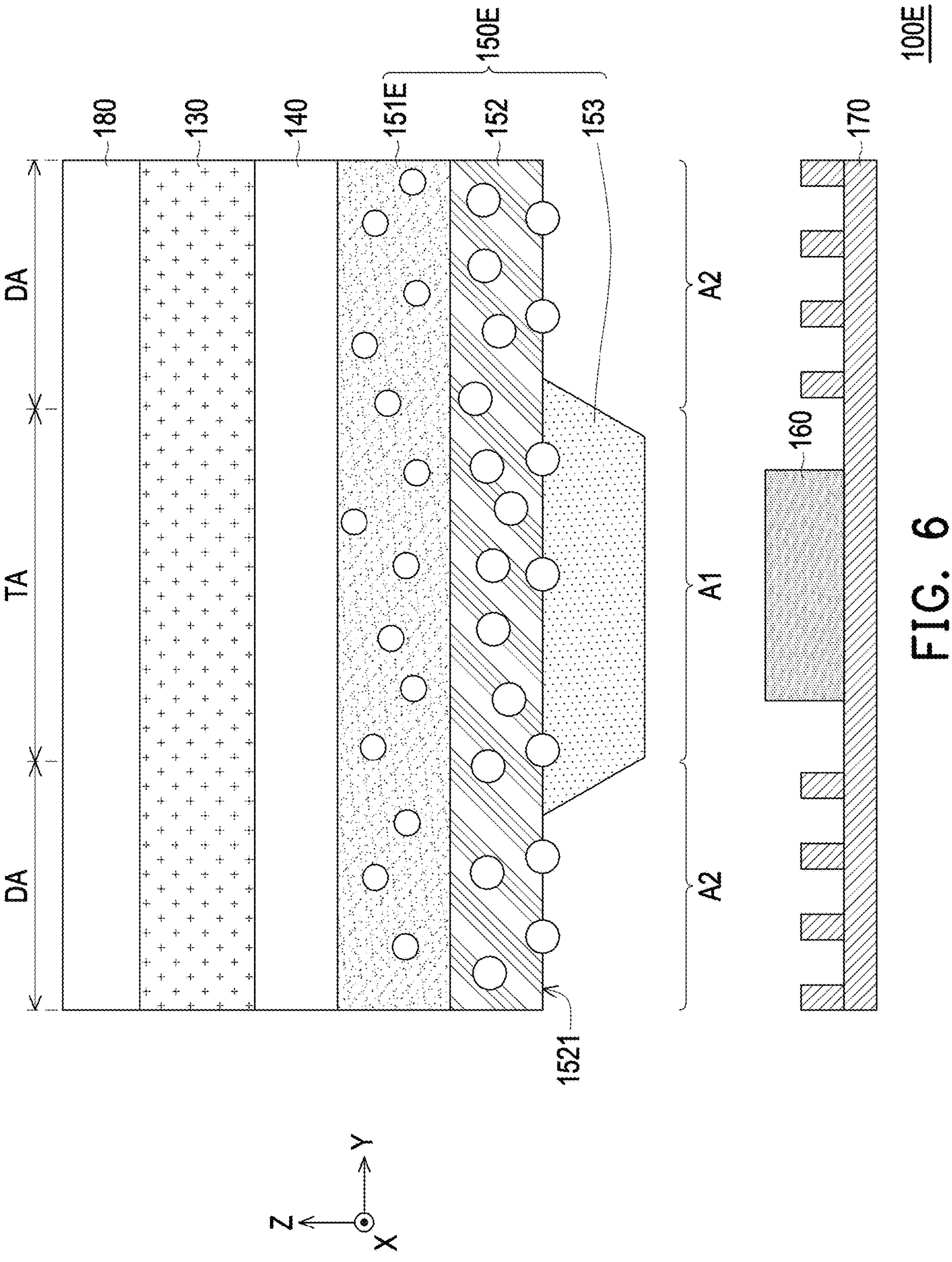

Referring to FIG. 6, in the embodiment, a display device 100E is slightly different from the display device 100C in FIG. 4. The main difference is that: a first bonding layer 151E also has scattering particles. Here, the first bonding layer 151E is, for example, a PSA in which scattering particles are added. However, the disclosure is not limited thereto.

In the embodiment, both the first bonding layer 151E and the film 152 have scattering particles. Accordingly, the internal haze degree of the first region A1 of the film set 150E is greater than 0% and less than or equal to 70%. When the camera module 160 is imaging, the image quality may be enhanced. In addition, with the design of the film set 150E, when the display layer 130 emits light, the display device 100E may exhibit favorable imaging quality.

In view of the foregoing, in the display device according to the embodiments of the disclosure, the film set is located between the backlight module and the lower polarizing plate. The side of the first region of the film set facing the camera module has a flat outer surface, the external haze degree of the first region is 0, the second region includes scattering particles, and the total haze degree of the second region is greater than 0. Since the camera module is disposed in correspondence with the set first region, when the camera module is imaging, the image quality may be enhanced. In addition, with the design of the film set, when the display layer of the display device emits light, the display device may exhibit favorable imaging quality. As a result, the display device may be moiré-free for as an LCD while achieving accuracy in UDC image recognition.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:

a display layer;

a lower polarizing plate, located below the display layer;

a film set, wherein the lower polarizing plate is located between the film set and the display layer, and the film set has a first region and a second region, wherein the film set comprises a first bonding layer having a solid portion completely covering the first region and the second region, and the lower polarizing plate has a solid portion completely covering the first region and the second region;

a camera module, disposed in correspondence with the first region; and a backlight module, wherein the film set is located between the backlight module and the lower polarizing plate, and an external haze degree of the first region is 0 and a total haze degree of the second region is greater than 0.

2. The display device as claimed in claim 1, wherein an internal haze degree of the first region is 0% to 70%.

3. The display device as claimed in claim 2, wherein the film set comprises a protective layer, and the protective layer is located between the first bonding layer and the backlight module.

4. The display device as claimed in claim 3, wherein the first bonding layer has scattering particles.

5. The display device as claimed in claim 3, wherein a side of the protective layer facing the camera module has a flat outer surface.

6. The display device as claimed in claim 1, wherein an internal haze degree of the second region is 5% to 70%, and an external haze degree of the second region is 0% to 70%.

7. The display device as claimed in claim 1, wherein a total haze degree of the first region is smaller than the total haze degree of the second region.

8. The display device as claimed in claim 1, wherein the film set comprises a film, scattering particles dispersed in the film, and a second bonding layer, the first bonding layer is located between the lower polarizing plate and the film, the film is located between the first bonding layer and the second bonding layer, the second bonding layer covers a portion of the scattering particles protruding from a surface of the film in the first region and exposes another portion of the scattering particles protruding from the surface of the film in the second region, the camera module overlaps the first region in a normal direction of the display layer and not overlaps the second region in the normal direction of the display layer, and the second bonding layer is located between the camera module and the surface of the film.

9. The display device as claimed in claim 8, wherein the second bonding layer corresponds to the first region, a width of the second bonding layer along a first direction is smaller than a width of the first bonding layer along the first direction, and the first direction is perpendicular to the normal direction of the display layer.

10. The display device as claimed in claim 8, wherein the second bonding layer has two sloped sides opposite to each other, and each of the sloped sides is inclined toward a center of the first region and defines an included angle with the film.

11. The display device as claimed in claim 10, wherein the included angle is less than 60 degrees.

12. The display device as claimed in claim 10, wherein the included angle ranges between 5 degrees and 80 degrees.

13. The display device as claimed in claim 10, wherein a side of the second bonding layer facing the camera module has a flat outer surface.

14. The display device as claimed in claim 8, wherein the second bonding layer has a thickness in the normal direction of the display layer, and the thickness is less than 20 micrometers.

15. The display device as claimed in claim 8, wherein the second bonding layer has a thickness in the normal direction of the display layer, and the thickness ranges between 5 micrometers and 200 micrometers.

16. The display device as claimed in claim 1, wherein a width of the camera module along a first direction is smaller than a width of the first region along the first direction, and the first direction is perpendicular to a normal direction of the display layer.

17. A display device, comprising:

a display layer;

a lower polarizing plate, located below the display layer;

a film set, wherein the lower polarizing plate is located between the film set and the display layer, and the film set has a first region and a second region, wherein the film set comprises a first bonding layer having a solid portion completely covering the first region and the second region, and the lower polarizing plate has a solid portion completely covering the first region and the second region;

a camera module, disposed in correspondence with the first region; and a backlight module, wherein the film set is located between the backlight module and the lower polarizing plate, a side of the first region facing the camera module has a flat outer surface, and the second region comprises scattering particles.

18. The display device as claimed in claim 17, wherein the film set comprises a film, and a second bonding layer, the scattering particles is dispersed in the film, the first bonding layer is located between the lower polarizing plate and the film, the film is located between the first bonding layer and the second bonding layer, the second bonding layer covers a portion of the scattering particles protruding from a surface of the film in the first region and exposes another portion of the scattering particles protruding from the surface of the film in the second region, the camera module overlaps the first region in a normal direction of the display layer and not overlaps the second region in the normal direction of the display layer, and the second bonding layer is located between the camera module and the surface of the film.

* * * * *